Patented May 7, 1940

2,199,925

UNITED STATES PATENT OFFICE 2,199,925

METHOD OF IMPROVING THE STABILITY OF ALKALINE SOLUTIONS OF PHENOLIC AZO DYESTUFF COMPONENTS

Theodorus Petrus Wilhelmus Sanders and Jacob van Rensen, Venlo, Netherlands, assignors to Naamlooze Vennootschap Chemische Fabriek L. van der Grinten, Venlo, Netherlands, a company of the Netherlands No Drawing. Application February 5, 1938, Serial No. 188,912. In the Netherlands November 5, 1937

7 Claims. (Cl. 95—6)

Solutions containing azo dyestuff components are often used as developers in the diazotype copying process. Such solutions are often subjected to a special kind of deterioration which appears to be caused chiefly by oxidation on exposure to air. For instance alkaline solutions of substances such as β-naphthol, resorcinol, phloroglucinol and similar univalent or polyvalent phenols become brown when exposed to the air and the content of the solutions of these substances becomes smaller after prolonged action of air.

It has now been found that in many cases this deterioration on exposure to air of these solutions in so far they contain exclusively phenolic azo dyestuff components may be prevented by adding a compound of tin to said solutions or to mixtures used in the preparation of such solutions. Suitable compounds e. g. are stannous chloride, stannic chloride, stannates, stannites, chlorostannates etc. As a rule the deterioration increases with the pH-value of the solution and as a rule the decrease of the deterioration caused by the addition of a tin compound is also more important at higher pH-values.

The deterioration of alkaline solutions of azo dyestuff components consisting of aromatic amino compounds is generally far greater than the deterioration of solutions of purely phenolic azo dyestuff components and the addition of tin compounds is not sufficient to prevent this increased deterioration. Therefore the present invention contemplates the addition of tin compounds only to solutions of exclusively phenolic azo dyestuff components, i. e. azo dyestuff compounds which can act as such exclusively on account of their phenolic function but not containing amino groups.

As an addition to pulverant mixtures used for making the improved solutions according to the invention acid reacting tin compounds, such as chloro-stannates, are more suitable than alkaline reacting tin compounds such as stannates. In order to prevent in such pulverant mixtures the reaction of alkaline reacting substances, such as stannates on phenols or of acid reacting chloro stannates on substances sensitive to acids which may be present in the mixture such as thiosulfates, it is advantageous to prevent mutual contact between such substances. This may be effected by mixing intensely the relatively small quantity of tin compound with one of the constituents of the powder with which a similar reaction does not take place.

Example 1

To a solution of 6% of sodiumthiosulfate, 2% of thiourea, 1% of borax, 1.5% of soda, 2% of resorcinol, which solution may be used as a developer in the positive diazotype process, 0.1% of sodium stannate is added. This solution deteriorates less quickly to the air than the solution without stannate.

Example 2

There is made an intensely mixed pulverant mixture of 2 parts by weight of thio urea with 0.05 part by weight of sodium chlorostannate and this mixture is further mixed with 6 parts by weight of sodium thio sulfate, 1 part by weight of borax, 0.025 part by weight of the substance known as Nekal (registered trade-mark for the sodium salt of isopropyl naphthalene sulfonic acid), 0.6 part by weight of phloroglucinol, and 0.6 part by weight of resorcinol. If this mixture is dissolved together with 3 parts by weight of soda in 100 parts by weight of water the solution is better proof against deterioration to the air than a solution of a similar mixture without chlorostannate.

The instant invention is not concerned with developing solutions of the photographic type, wherein the function of the solution is to reduce a silver halide to silver after the halide has been activated by light, but is solely concerned with developing solutions of the diazo type, wherein diazo compounds are converted into azo dyestuffs, such diazo type solutions being free of sulfites (salts of sulfurous acid) which inhibit the dyestuff formation.

What we claim is:

1. Diazotype developing solution of alkaline reaction comprising an exclusively phenolic azo dyestuff component and not in excess of 0.1% of a tin compound.

2. Diazotype developing solution according to claim 1, in which the tin compound is a stannate.

3. Diazotype developing solution of alkaline reaction comprising phloroglucinol as azo dyestuff component and not in excess of about 0.1% of a tin compound substantially completely in solution.

4. Diazotype developing solution of alkaline reaction comprising resorcinol as azo dyestuff component and not in excess of about 0.1% of a tin compound substantially completely in solution.

5. A diazo type copying developer consisting of a pulverulent mixture comprising an exclusively phenolic azo dyestuff component and a chlorostannate in a quantity not in excess of 0.1% of the diazo type solution producible therefrom.

6. A diazo type copying developer consisting of a pulverulent mixture comprising phloroglucinol and a chlorostannate in a quantity not in excess of 0.1% of the diazo type developing solution producible therefrom.

7. A diazo type copying developer consisting of a pulverant mixture comprising resorcinol and a chlorostannate in a quantity not in excess of 0.1% of the diazo type developing solution producible therefrom.

THEODORUS P. W. SANDERS.
JACOB van RENSEN.